INVENTOR
WILLIAM J. CONOVER

Nov. 8, 1966   W. J. CONOVER   3,283,744
MULTIPLE FLOOR LIVESTOCK FEEDING AND FARROWING BUILDING
Filed March 12, 1965   5 Sheets-Sheet 2

INVENTOR
WILLIAM J. CONOVER
BY
Robert Henderson
ATTORNEY

INVENTOR
WILLIAM J. CONOVER
BY
N. Robert Henderson
ATTORNEY

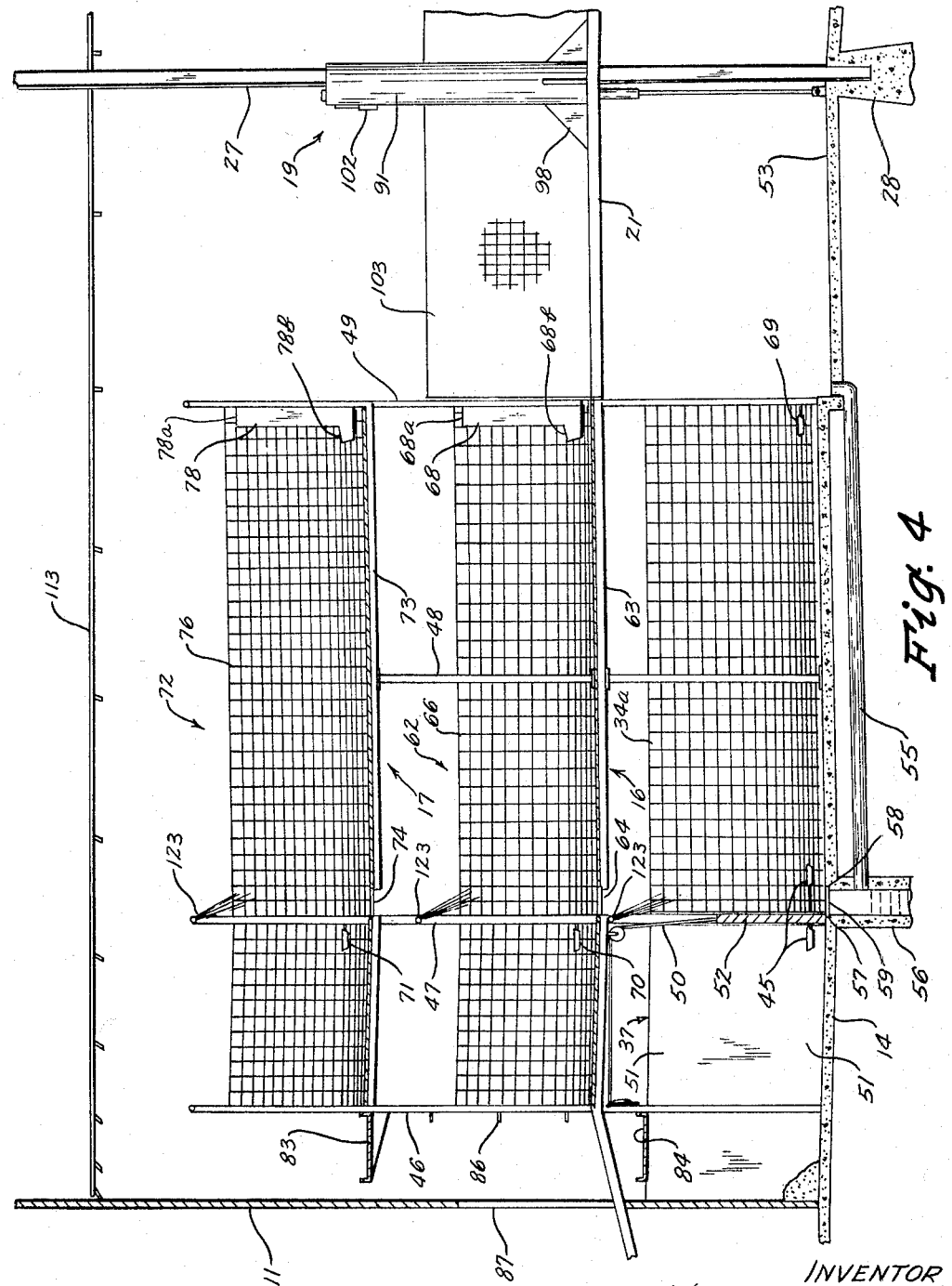

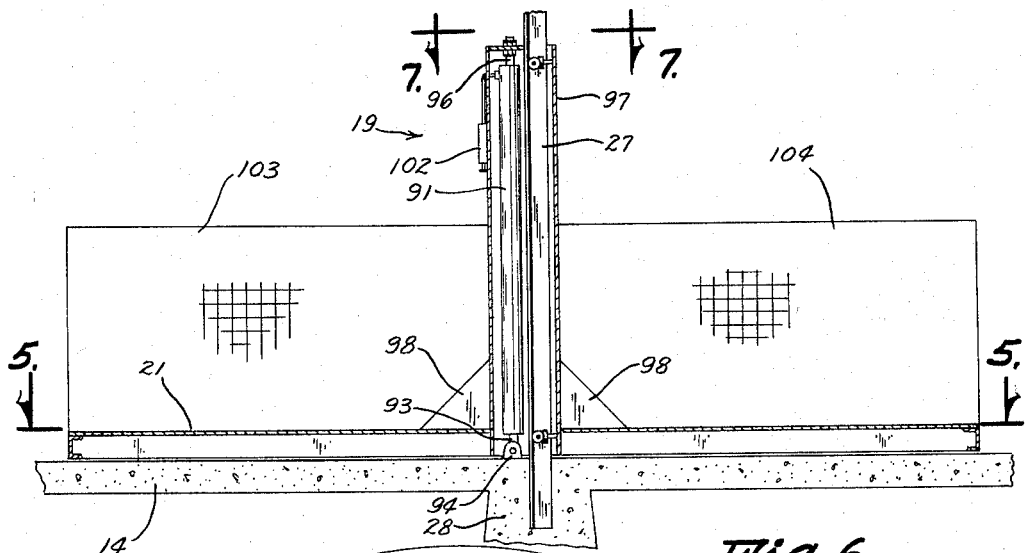
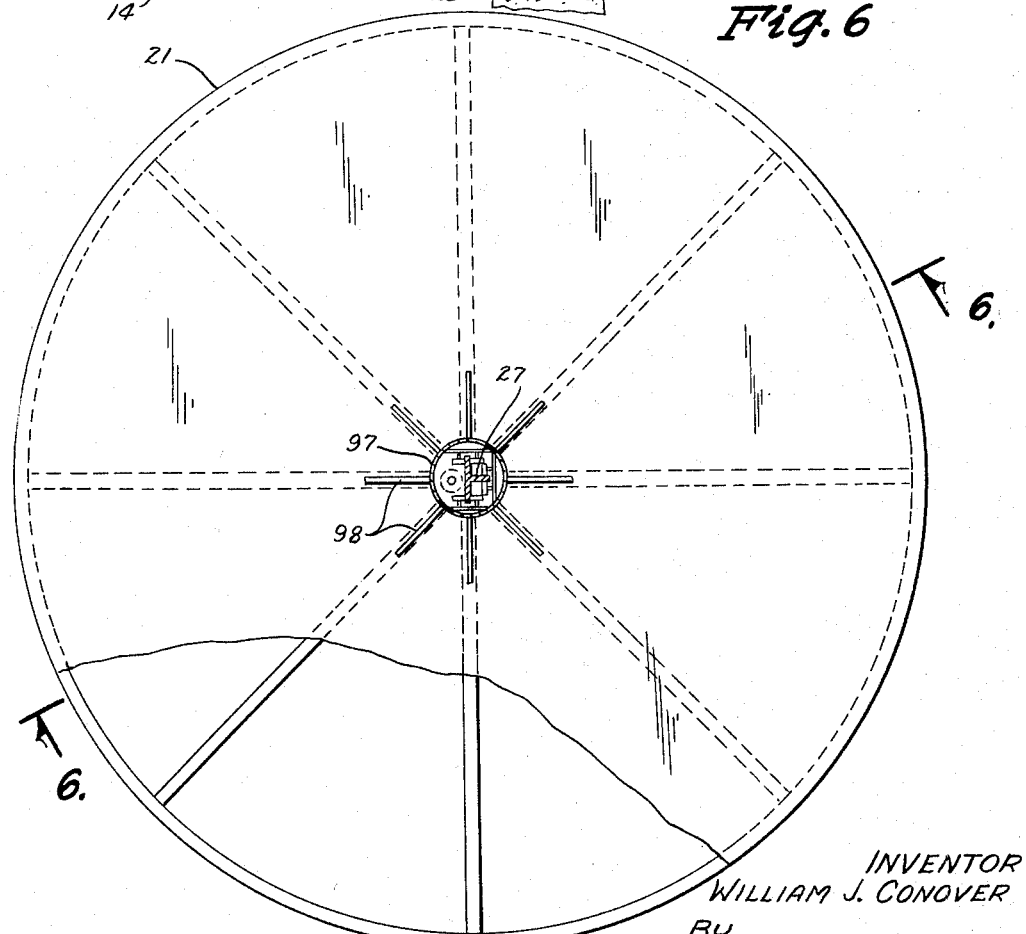

3,283,744
MULTIPLE FLOOR LIVESTOCK FEEDING AND
FARROWING BUILDING
William J. Conover, Rhodes, Iowa, assignor to Black, Sivalls & Bryson, Inc. (BS&B), Kansas City, Mo., a corporation of Delaware
Filed Mar. 12, 1965, Ser. No. 439,215
8 Claims. (Cl. 119—16)

This invention relates generally to new and useful improvements in raising livestock, and pertains particularly to a farrowing and feeding in the form of a multi-story farm animal feeding house adapted for a smooth and quick flow of traffic by the livestock.

It is an object of this invention to provide an improved farm animal farrowing and feeding house.

It is another object of this invention to provide a farm animal farrowing and feeding house of a design enabling a triple floor utilization of space with automatic feeding of the animals, with efficient removal of the manure to provide a healthy and clean atmosphere, and enabling substantanially effortless operation by the operator to effect smooth maneuverability of the livestock on and about the floors.

Yet another object of this invention is to provide an improved feeding and farrowing building having a plurality of floors for the animals in conjunction with a novel means of transporting and moving the animals from one floor to another, wherein at each floor, the stalls thereon are all substantially contiguous and available to the transporting means.

Still another object of this invention is the provision of a triple or other multiple floor feeding and farrowing building for farm animals wherein a central open access area is provided which is common to all the floors, and which enables a smooth flowing traffic of the livestock about each floor and between the floors.

Another object of this invention is the provision of an improved arrangement of livestock stalls on a plurality of floors whereby at least one stall on each floor is supplied simultaneously with feed, and further whereby each floor has provisions for passing manure through a slotted portion thereof vertically common with the like portions of the other floors and through to an annular trench formed in the ground floor for ready disposal of the manure.

It is yet another object of this invention to provide a farm animal feeding and farrowing building wherein at least three floors are provided for the livestock, and wherein an overhead feed delivery structure combines with outer walls of the building and of one or more of the floors to provide a simultaneous feed to all floors.

Still another object of this invention is the provision of a building structure as outlined hereinbefore, and wherein a novel elevator unit is provided for servicing particularly all livestock stalls on the upper floors, whereat one stall may be opened directly to and only with another one or more stalls via the elevator unit, and further wherein the elevator serves in a dual capacity as a weighing scale for the purpose of quickly and accurately weighing the livestock within the building and within the central access area formed therein.

These objects and other features and advantages of this invention will become readily apparent upon reference to the following description, when taken in conjunction with the accompanying drawings, wherein:

FIG. 4 is an enlarged, fragmentary side elevational view of the three floors of the building and the elevator unit;

FIG. 5 is an enlarged plan view of the platform of the elevator unit, taken along the line 5—5 in FIG. 6, certain parts broken away and others in section for clarity of illustration;

FIG. 6 is an enlarged vertical sectional view of the elevator as taken along the line 6—6 in FIG. 5.

Figure 3:
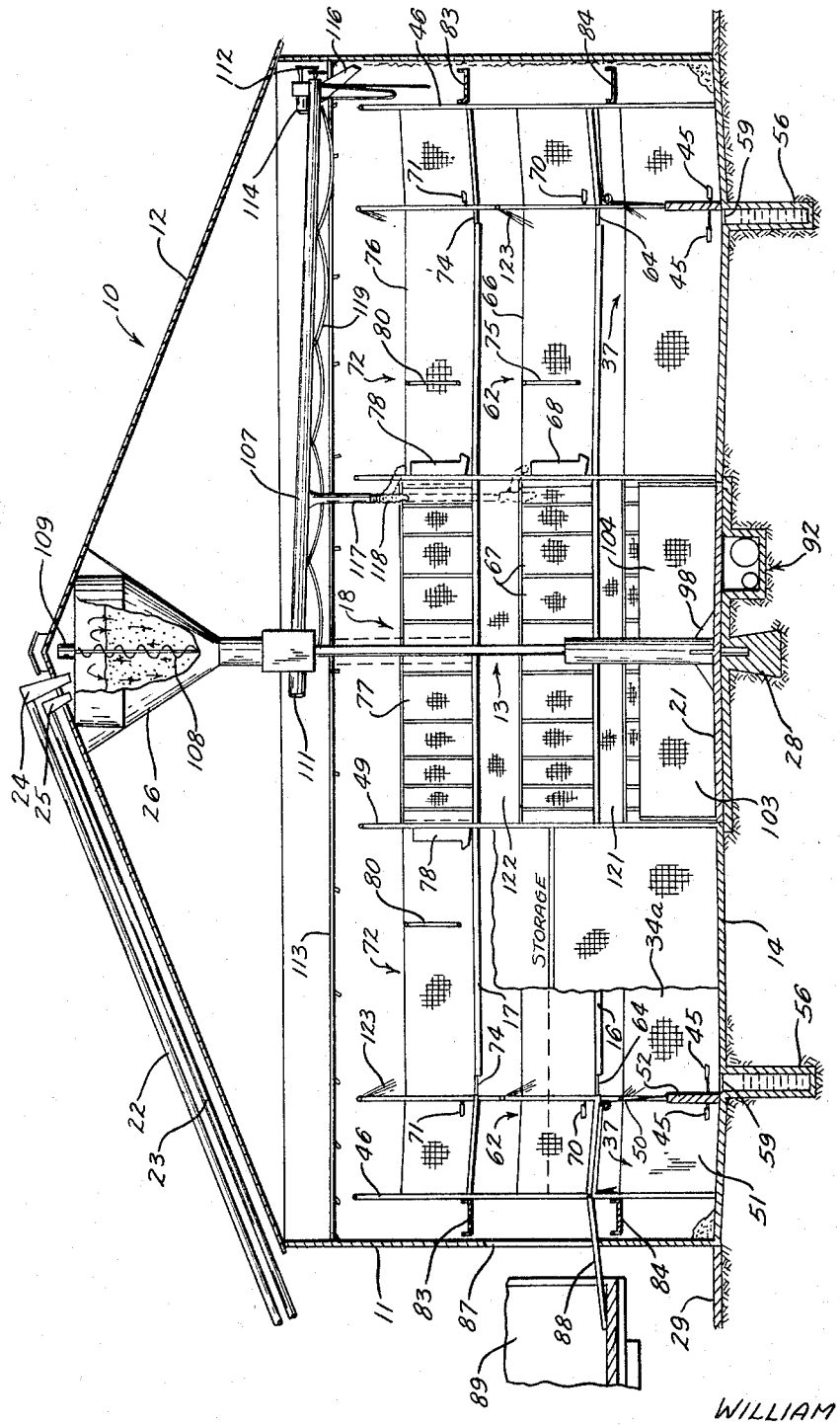
FIG. 3 is a vertical sectional view of the building taken substantially across the diameter of the building, and showing the entire height and width of the building.

Referring to the drawings, the multiple story feeding and farrowing building of this invention is indicated generally at 10 in FIG. 3. The building 10 comprises generally an upstanding wall 11 forming a substantially circular enclosure, and upon which is mounted a conical roof 12. In addition to the support of the roof 12 by the wall 11, the only other support thereof is by a central post assembly indicated generally at 13 in FIG. 3. The building 10 includes further a first floor 14 of a concrete slab nature, and a pair of vertically spaced second and third floors 16 and 17, respectively, supported on and above the first floor 14 and within the wall 11. All three floors 14, 16 and 17 have a common central access area, indicated generally at 18 in FIG. 3, which access area 18 is circular in nature and extends radially about the central post assembly 13 the entire height of the three floors.

Slidably mounted on the central post assembly 13 is an elevator unit indicated generally at 19 in FIG. 4, and which includes a horizontally disposed, circular, relatively flat platform 21 which extends over the entire central access area for any given floor. The platform 21 is movable from a position resting on and level with the first floor 14, to a position level with the second floor 16, and then to a position level with the third floor 17, and of course is movable up and down to any particular position. At each floor, the platform 21 permits human working and walking, and rapid animal movement between all of the hereinafter described stalls on the particular floor.

The building 10 includes further a feed dispensing unit which utilizes a pair of auger booms 22 and 23 (FIG. 3). Both of the booms extend upwardly from a feed mix housing (not shown) mounted for receiving feed from conventional bulk feed tanks. Grain can be supplied from one tank via the feed mix housing with or without protein or other feed supplements through one boom 22, while chopped hay and silage or the like can be supplied from a silo (not shown) or other like storage tank through the other boom 23.

The upper ends of the booms 22 and 23 include spouts 24 and 25, respectively, which extend through an opening provided therefor in the conical roof 12 for depositing the feed into a large hopper 26. The hopper 26 doubles as a holder of the granular feed material, and as a central support for the roof 12, by means of the hopper 26 being of a solid funnel nature mounted at its lower end on a center post 27 and fastened at its circular upper end to the roof 12. The center post 27, as a part of the central post assembly 13, is in turn supported on a concrete pedestal 28 placed in the ground.

Figure 1:
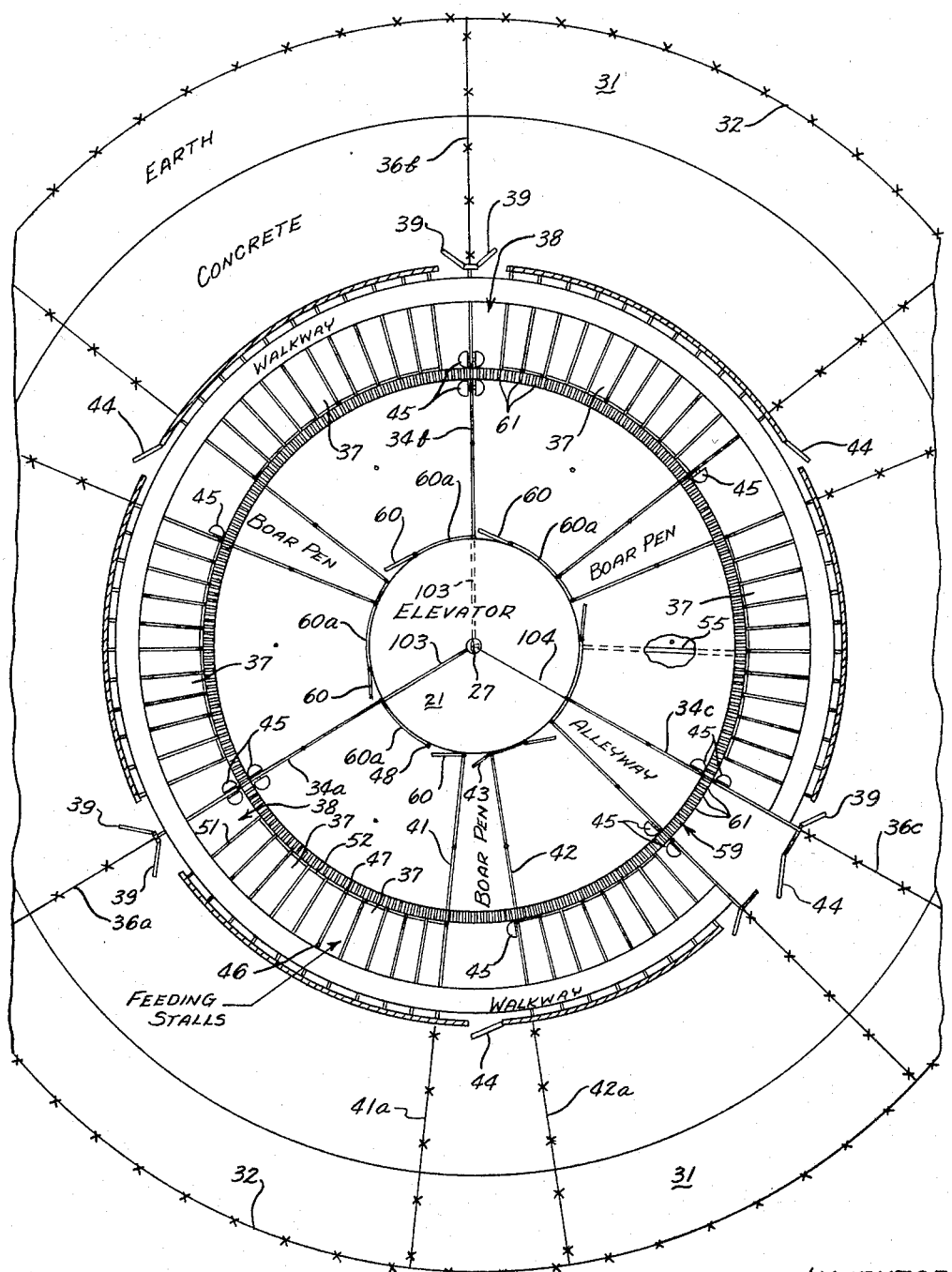
FIG. 1 is a plan view of the first floor arrangement, and of the outer contiguous ground area, of a multi-story farrowing and feeding building, certain parts broken away for clarity of illustration.

Referring particularly to FIG. 1, the first floor concrete slab 14 extends beyond the wall 11 and includes a circular outer parapet 29 of a concrete slab nature. Extended beyond the outer parapet 29 is an annular earth area 31 about which extends a fence 32. It will be noted upon referring to FIG. 1 that the first floor 14, the outer parapet 29, and the earth area 31 as a whole are divided into three pie-shaped segments by means of three radially extended partitions 34a, 34b, and 34c within the wall 11, and by three radially extended fence sections 36a, 36b, and 36c outside of the wall 11. The three segments are substantially identical, each having a group of radially exstantially identical, each having a group of radially extended, arcuately contiguous feeding stalls 37 formed within the wall and their outer ends of which are contiguous with same, and each including a radially extended boar pen as indicated. Ingress and egress to and from both the feeding stalls 37 within each segment and the outer parapet 29 and earth area 31 is provided by passageways 38 and gates 39, the latter being formed in the wall 11. Each segment is provided with at least a pair of automatic watering devices 45 whereby the animals in the segments are always provided with fresh water.

Each boar pen is formed by a pair of arcuately spaced, radially extended partitions 41 and 42, with like fence extensions 41a and 42b provided outside the wall 11. An opening in the wall 11 is provided with a gate 44, and another gate 43 is provided at the inner end of each boar pen for passage to and from the access area 18. Watering devices 45 are also provided in the boar pens. One of the segmental areas is provided with an alleyway (FIG. 1) for ingress and egress to and from the building for both man and animals.

Mounted on the first floor 12 (FIGS. 1 and 3) are a plurality of radially spaced posts 46, 47, 48 and 49, sets of which are arranged in arcuately spaced relation to form a support for the remaining structure of the building 10. On the first floor 14, the feeding stalls 37 are formed by a plurality of radially extended flat panels 51 (FIG. 4) the height of which is sufficient to extend above a hog or the like, and the inner ends of which are joined by a series of vertically movable gates 52. Referring to FIG. 3, it will be seen that an overhead cable and pulley unit 50 is arranged to enable the operator to raise and lower each gate 52. The gates 52 face an annular open area (FIG. 1) the inner edge of which is contiguous with the outer periphery of the access area 18.

A sanitation trough 56 is formed in the floor 14 just inside the gates 52, has a general U-shaped formation in cross-section (FIG. 3), and extends about the floor 14 in an annular manner. The trough 56 slopes toward and is joined to a radially extended disposal trench (not shown) which extends beneath the floor 14 to lead off and away from the trough 56 to a septic tank area outside of the building 10. It will be noted by referring to FIG. 3, that the floor 14 slopes from the periphery thereof adjacent the wall 11, and from the periphery thereof of the access area 18 both downwardly and radially toward the sanitation trough 56 so that all flow and other wastes will move by gravity and by movement of the animals into the trough 56 for disposal. Likewise, the area of the floor 14 about the center post 27 also under the floor 14 leading to the trough slopes toward the trough 56, and is provided with a passage 55 (FIGS. 1 and 4).

Square shoulders 57 and 58 (FIG. 4) are provided about the upper inner and outer edges of the trough 56 to provide support completely around same for a first floor grate 59. The grate 59 is comprised of a series of arcuately spaced, pie-shaped slabs 61 (FIG. 1) having sufficient arcuate spacing therebetween to enable the waste material to fall therebetween, while yet providing sufficient floor space on which the animals may walk without injury. Referring to FIG. 3, it can readily be seen that when the platform 21 of the elevator unit 19 is resting on the first floor 14, the operator of the building 10 and the animals on the first floor can easily and readily move about the first floor, walking directly on and over the platform 21. Gates 60 (FIG. 1) are provided, however, on the first floor, in combination with arcuate fence sections 60a about the periphery of the access area 18, to provide a controlled movement of the animals from the grate 59 inwardly and over the floor 14 on the platform 21 when lowered.

The second floor 16 (FIGS. 2-4) includes a plurality of livestock stalls 62 formed by a horizontally disposed supporting floor panel 63 extended between adjacent pairs of posts 46 and 49 (FIG. 4). Similar to the slope of the first floor 14, the second floor panel 63 is sloped radially and downwardly from both the wall 11 and the access area 18 toward an opening in the panel covered by a grate 64. The grate 64 extends in an annular arrangement directly over the first floor grate 59. The stalls 62 are completed by radially extended fence partitions 66 extended between the outer post 46 and the inner post 49 (FIG. 4), with each stall 62 having an outwardly swingable gate 67 (FIG. 2).

Figure 2:
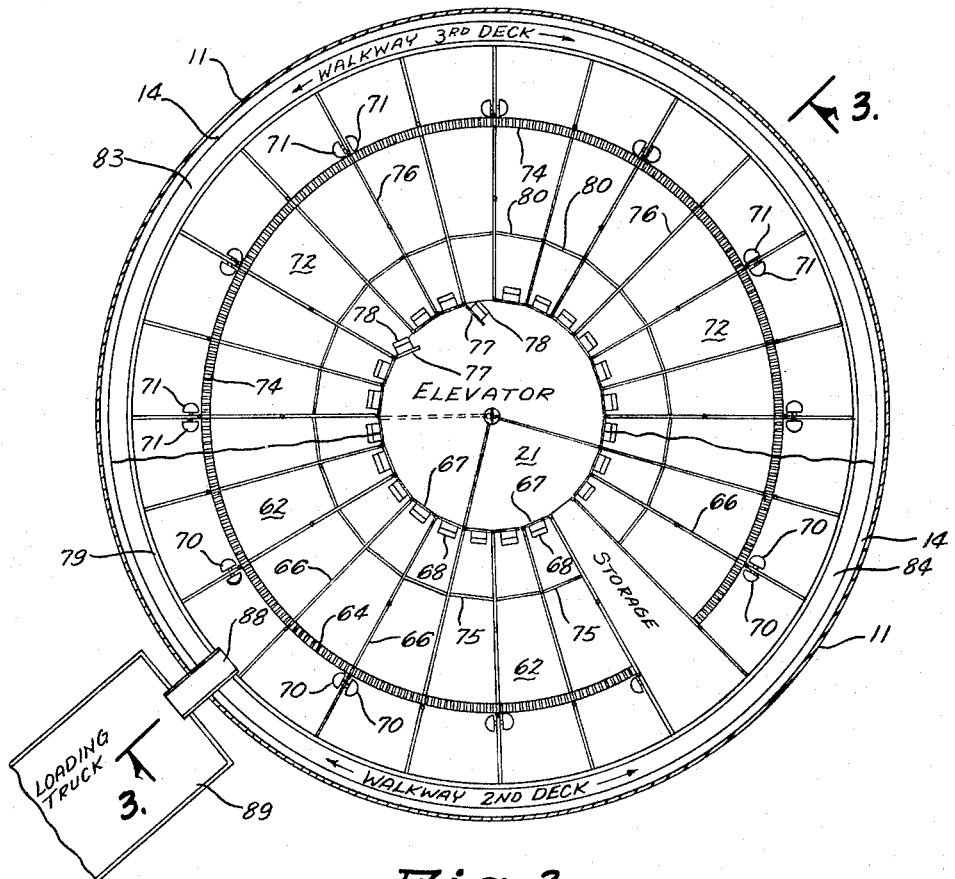
FIG. 2 is a reduced plan view of the building, showing by a broken line the plan view of both the second and third floor arangements.

On the inside of each gate 67 on the second floor 16 is mounted a feeder box 68 for holding feed for the animals in each stall, as best illustrated in FIG. 2. Each feeder box 68 is open at the top 68a and has an extended base 68b which is open at the top at a height sufficient to enable the litter to feed therefrom.

Automatic watering devices 70 are provided on the second floor 16 (FIG. 4) on each side of every other post 47. Furthermore, each stall 62 has a creep guard 75 (FIG. 3) extended between arcuately adjacent posts 48. The lower edge of each guard 75 is spaced above the floor panel 63 sufficiently to enable the pigs to move back and forth within each stall, but keeps the sow in the outer area of the stall and away from the feed box 68. Referring to FIGS. 2 and 3, it will be noted that a storage area is formed over the first floor alleyway, instead of a stall.

The third floor 17 is substantially identical to the second floor in that a plurality of radially extended, arcuately segmental stalls 72 (FIGS. 2 and 4) are formed again by a supporting floor panel 73 extended between the posts 46 and 49, with the panel 73 extended downwardly in a flat V toward an opening covered by an annular grate 74. Again, the grate 74 is directly over the second floor grate 64. Thus, all waste and disposal from the third and second floors fall through to the first floor grate 59 and into the sanitation trough 56. Radially extended fence partitions 76 divide the second floor into stalls 72, with gates 77 provided at the inner ends of the stalls 72. Similar to the second floor stalls 62, each third floor stall 72 also is provided with an automatic watering device 71, and a feeder box 78 open at the top 78a and with a feed base 78b also open on the top side for the pigs. Creep guards 80 (FIG. 3) are also provided for each third floor stall 72. A circular fence section 79 extends completely around from the second floor 16 to the third floor 17 so as to completely encircle both second and third floors.

To enable the operator to view both the first and the second floors, and the second and the third floors simultaneously, a pair of annularly extended catwalks 83 and 84 (FIG. 4) are supported on the outer posts 46. By this arrangement, upon walking about the upper catwalk 83, the operator can see into both the second and third floors 16 and 17. A hinged opening (not shown) is formed in the upper catwalk 83 whereby the operator may climb down (or up as the case may be) a ladder arrangement 86 (FIG. 4) into the lower catwalk 84 for viewing both the first and second floors 14 and 16. At the alleyway (FIG. 1), means are provided for the operator to move from the lower catwalk 84 down and onto the first floor 14. Referring to FIGS. 2 and 3, it is seen that an opening 87 is formed in the wall 11 to provide for a loading ramp 88 or the like to be placed between one of the stalls 62 on the second floor particularly adapted to this purpose, and a loading truck 89. Thus, livestock can readily be moved into and out of the building 10 from one of the upper floors.

The elevator unit 19 for moving livestock and other material between the floors within the building 10, in addition to having the platform 21 (FIG. 6), includes a conventionally operated, telescoping hydraulic cylinder 91 which is fluidly connected to a hydraulic pump and reservoir assembly 92 (FIG. 3). The cylinder 91 is connected at its lower end 93 (FIG. 6) to a mounting 94 on the first floor 14, and is connected at its upper end 96 to a pipe housing 97 integral with the platform 21 and supportably connected thereto by means of a plurality of gusset plates 98.

Figure 7:
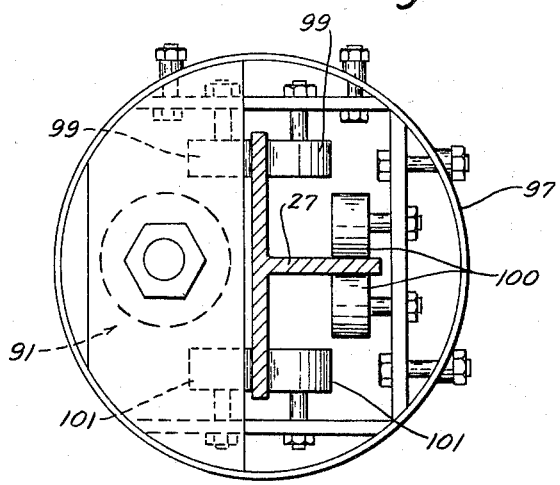
FIG. 7 is a greatly enlarged sectional view taken along the line 7—7 in FIG. 6.

As clearly illustrated in FIG. 7, three pairs 99, 100, and 101 of rollers are engaged with the three flanges of the I-beam type center post 27 at the upper and lower ends of the cylinder 91 (FIG. 6), whereby upon telescopic actuation of the cylinder 91, the platform 21 is slidably moved upwardly and downwardly of the center post 27. The elevator unit 19 is arranged to carry and to weigh any poundage up to approximately a load of 2000 pounds, with the weight visible by means of a hydraulic gauge 102 (FIG. 6) mounted on the exterior of the housing 97. The gauge is settable to zero at the will of the operator such that he can weigh each animal separately, or as a group as the case may be. The weighing can be accomplished at any position of the platform 21.

To protect the animals during movement of the platform 21, a circular fence partition 121 and 122 (FIG. 3) is mounted about each floor 14 and 16 above the inner gates and below the floor above. These stationary fence partitions thus prevent an animal from falling off the platform 21 during movement of same. A pair or more of fence partitions 103 and 104 (FIGS. 1 and 6) can be swingably mounted on the housing 97 and about the platform 21 to help group the animals for loading and unloading purposes.

Referring to FIG. 3, the feed dispensing apparatus 22 in addition to the hopper 26 includes a horizontally disposed auger conveyor 107. Internally of the hopper 26 is a vertically disposed auger 108 driven by a reversible motor 109 mounted at the top of the hopper 26. Should the conveyor 107 be non-operating, rotation of the auger 108 in one direction would result in a mixing and blending of the feed material held within the hopper 26. With the conveyor 107 operating normally, rotation of the auger 108 in the opposite direction will force the feed material downwardly within the hopper 26 and into the inner end of the conveyor 107.

The auger conveyor 107 is horizontally disposed radially outwardly from the center post 27, and includes an auger (not shown) therein rotated by a motor 111 at the inner end of the conveyor 107. The outer end of the conveyor has a wheel 112 for rotation on a track 113 supported about the interior of the wall 11, and which wheel 112 is rotated by a reversible motor 114. By this arrangement, arcuate movement of the conveyor 107 can be easily controlled, either manually or automatically.

At the outer end of the auger conveyor 107, a down spout 116 (FIG. 3) is mounted and which is directed outwardly toward the inner surface of the building wall 11. Thus, feed from this spout 116 is deflected against the wall 11, then falls straight downwardly between the outer peripheral edges of the two catwalks 83 and 84 (FIG. 3) and the wall 11 for disposition on the first floor 14.

Intermediate the spout 116 and the inner end of the auger conveyor 107, another down spout 117 is provided, with an accordion-type end portion 118. By this arrangement, as best illustrated in FIG. 3, the spout 117 and end portion 118 can be used, by the operator standing on the platform 21, to fill any feed box 78 on the third floor 17, or upon extension, any feed box 68 on the second floor 16. The amount and rate of feed transmitted through either spout 116 or 117 can be controlled in any conventional manner.

As a part of the watering system, and primarily for aiding in flushing out the stall floors, a water line 119 (FIG. 3) is extended from the center post 27 beneath the auger conveyor 107 and looped above the catwalks 83 and 84. Thus, the operator can stand on either catwalk and direct water under pressure into the stalls on both upper floors. Additionally, water sprays 123 are mounted on the posts 47 for aiding in maintaining a healthy, disease free environment within the building 10.

In summarization, it is readily seen from the description and the drawings, that a farm animal house is provided, which is of a design enabling a triple floor utilization of space with automatic feeding of the animals, with sufficient removal of the manure to provide a healthful atmosphere, and which enables a substantially effortless operation by the operator to maintain and continue a substantially automatic farrowing and feeding of the livestock.

Although a preferred embodiment and method of practicing the invention has been described hereinbefore, it is to be remembered that various modifications can be made thereto without departing from the true spirit and scope of the invention as defined in the appended claims.

I claim:

1. A farm animal feeding building comprising in combination:
    an upstanding wall forming a substantially circular enclosure, said wall having at least one opening formed therein for ingress and egress purposes;
    a roof on said wall;
    a first floor within said enclosure, said first floor having an annular sanitation trough formed therein, said trough spaced radially from the center of the first floor;
    a grate supported on said first floor and over said trough;
    a plurality of partitions supported on said first floor and forming a plurality of stalls, said trough passing beneath a portion of said stalls;
    a second floor supported within said enclosure above said first floor;
    a plurality of partitions including radially extended ones of said partitions supported on said second floor and forming a plurality of stalls, said second floor stalls having inner closeable ends spaced outwardly from the center of said second floor;
    said second floor having an annular slotted opening formed therein beneath said second floor stalls and above said trough; and
    elevator means including an annular substantially flat platform movable from a first floor position to a second floor position level with said second floor, the outer periphery of said platform movable to a position contiguous to said stall ends.

2. A farm animal feeding building comprising in combination:
    an upstanding wall forming a substantially circular enclosure, said wall having at least one opening formed therein for ingress and egress purposes;
    a roof on said wall;
    a first floor within said enclosure, said first floor having an annular sanitation trough formed therein, said trough spaced radially from the center of the first floor to provide a central floor area with the confines of said trough, said central floor area adapted for human walking and working;
    a grate supported on said first floor and over said trough;
    a plurality of partitions supported on said first floor over said trough and forming a plurality of radially contiguous stalls about said central floor area;
    a second floor supported within said enclosure above said first floor;
    a plurality of partitions including radially extended ones of said partitions supported on said second floor and forming a plurality of stalls, said second floor stalls having inner closeable ends spaced outwardly from the center of said second floor, said stall ends formed, in plan view, contiguous with the periphery of said central floor area;

said second floor having an annular slotted opening formed therein beneath said second floor stalls and above said trough; and elevator means including an annular substantially flat platform extended over said central floor area and adapted for human walking and working, said platform movable vertically to and from a position level with said second floor and contiguous with said stall ends thereon.

3. A farm animal feeding building comprising in combination:

an upstanding wall forming a substantially circular enclosure, said wall having at least one opening formed therein for ingress and egress purposes;

a roof on said wall;

a first floor within said enclosure, said first floor having an annular sanitation trough formed therein, said trough spaced radially from the center of the first floor to provide a central floor area with the confines of said trough, said central floor area adapted for human walking and working;

a grate supported on said first floor and over said trough;

a plurality of partitions supported on said first floor and forming a plurality of stalls, said trough passing beneath a portion of said stalls;

a plurality of other floors supported in vertically spaced relation above said first floor and within said enclosure;

a plurality of partitions including radially extended ones of said partitions supported on each other floor and forming a plurality of stalls, each plurality of stalls on each other floor having inner closeable ends forming an annular area directly above and vertically aligned with said first floor central floor area;

said other floors each having an annular slotted opening formed therein vertically aligned with each other and with said trough; and elevator means including a substantially flat, annular platform adapted to extend across said central floor area, and said platform movable vertically to each of said other floors so as to be level therewith and contiguous to the ends of said stalls thereon.

4. A farm animal feeding building comprising in combination:

an upstanding wall forming a substantially circular enclosure, said wall having at least one opening formed therein for ingress and egress purposes;

a roof on said wall;

a first floor within said enclosure;

a plurality of partitions supported on said first floor and forming a plurality of stalls the outer ends of which abut against said wall;

a plurality of other floors supported in vertically spaced relation above said first floor;

a plurality of partitions supported on each other floor and forming a plurality of stalls thereon, the outer ends of said stalls on said other floors spaced inwardly from said wall and the inner ends of said other floor stalls defining an annular open area;

said other floors having annularly extended perforated openings formed peripherally therein and adapted to pass material therethrough to a floor below, with material from above all floors adapted to fall through said openings to said first floor; and elevator means having a horizontally disposed platform movable vertically from said first floor to each of said other floors, said platform periphery contiguous with said inner ends of the stalls on each floor.

5. A farm animal feeding building comprising in combination:

an upstanding wall forming a substantially circular enclosure, said wall having at least one opening formed therein for ingress and egress purposes;

a roof on said wall;

a first floor within said enclosure, said first floor having an annular sanitation trough formed therein, said trough spaced radially from the center of the first floor to provide a central floor area with the confines of said trough, said central floor area adapted for human walking and working;

a grate supported on said first floor and over said trough;

a plurality of partitions supported on said first floor and forming a plurality of stalls, said trough passing beneath a portion of said stalls;

a plurality of other floors supported in vertically spaced relation above said first floor and within said enclosure;

a plurality of partitions including radially extended ones of said partitions supported on each other floor and forming a plurality of stalls, each plurality of stalls on each other floor having inner closeable ends forming an annular area directly above and vertically aligned with said first floor central floor area;

said other floors each having an annular slotted opening formed therein vertically aligned with each other and with said trough;

said other floor stalls having outer ends spaced inwardly from said wall whereby feed from above said other floors is adapted to fall adjacent said wall to said first floor; and elevator means including a substantially flat, annular platform adapted to extend across said central floor area, and said platform movable vertically to each of said other floors so as to be level therewith and contiguous to the ends of said stalls thereon.

6. A farm animal feeding building comprising in combination:

a circular upstanding wall;

a roof mounted on said wall;

an upright post mounted centrally of said wall and engaged with said roof for the only support therefor within said wall;

a plurality of vertically spaced floors for supporting livestock supported within said wall;

said floors all having a common central access area formed radially about said post; and elevator means including a telescoping hydraulic cylinder unit slidably connected to said post and carrying a horizontally disposed platform adapted to extend across said central access area, said unit operable to move said platform up and down said post to a level with each floor: said platform being substantially circular in plan view and surrounding said post, which post comprises the entire support therefor.

7. A farm animal feeding building comprising in combination:

a circular upstanding wall;

a roof mounted on said wall;

an upright post mounted centrally of said wall and engaged with said roof for the only support therefor within said wall;

a plurality of vertically spaced floors for supporting livestock supported within said wall;

said floors all having a common central access area formed radially about said post;

elevator means movably attached to said post, said elevator means including a platform extended across said central access area and movable vertically from one floor to another whereby to transport livestock therebetween, said platform being substantially circular in plan view and surrounding said post, which post comprises the entire support therefor;

a feed material holding hopper mounted on said post above said elevator means; and an elongated conveyor rotatably mounted at one end to said post and disposed to receive feed material from said hopper into said one end for movement to its other end, said conveyor other end rotatably engaged with said wall, said conveyor movable in a circular path around said post to discharge feed material downwardly toward said floors.

8. A farm animal feeding building comprising in combination:
    a circular upstanding wall;
    a roof mounted on said wall;
    an upright post mounted centrally of said wall and engaged with said roof for the only support therefor within said wall;
    a plurality of vertically spaced floors for supporting livestock supported within said wall;
    said floors all having a common central access area formed radially about said post;
    elevator means including a telescoping hydraulic cylinder unit slidably connected to said post and carrying a horizontally disposed platform adapted to extend across said central access area, said unit operable to move said platform up and down said post to a level with each floor, said platform being substantially circular in plan view and surrounding said post, which post comprises the entire support therefor;
    a feed material holding hopper mounted on said post above said elevator means; and
    an elongated conveyor rotatably mounted at one end to said post and disposed to receive feed material from said hopper into said one end for movement to its other end, said conveyor other end rotatably engaged with said wall, said conveyor movable in a circular path around said post to discharge feed material downwardly toward said floors.

References Cited by the Examiner

UNITED STATES PATENTS

| | | | |
|---|---|---|---|
| 1,186,444 | 6/1916 | Schuchardt | 119—16 |
| 1,505,810 | 8/1924 | Schuh | 187—19 |
| 3,043,401 | 7/1962 | Hallene et al. | 187—95 |
| 3,126,071 | 3/1964 | Basset | 187—19 |
| 3,148,663 | 9/1964 | Conover | 119—16 |
| 3,191,577 | 6/1965 | Murray | 119—16 |
| 3,205,859 | 9/1965 | Fine et al. | 119—52 |

SAMUEL KOREN, *Primary Examiner.*

ALDRICH F. MEDBERY, *Examiner.*